(12) United States Patent
Hahn et al.

(10) Patent No.: US 10,312,718 B2
(45) Date of Patent: Jun. 4, 2019

(54) SYSTEM FOR LEVITATING MOBILE TERMINAL

(71) Applicant: LG ELECTRONICS INC., Seoul (KR)

(72) Inventors: Sangwook Hahn, Seoul (KR); Inseok Yoo, Seoul (KR); Taehyun Kim, Seoul (KR); Sukho Hong, Seoul (KR); Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 15/314,858

(22) PCT Filed: Jun. 10, 2014

(86) PCT No.: PCT/KR2014/005090
§ 371 (c)(1),
(2) Date: Nov. 29, 2016

(87) PCT Pub. No.: WO2015/182806
PCT Pub. Date: Dec. 3, 2015

(65) Prior Publication Data
US 2017/0201194 A1  Jul. 13, 2017

(30) Foreign Application Priority Data

May 30, 2014  (KR) .................. 10-2014-0065554

(51) Int. Cl.
*H02J 7/02* (2016.01)
*H02J 50/90* (2016.01)
*H02J 50/70* (2016.01)
*H02J 50/12* (2016.01)
*H02N 15/00* (2006.01)
(Continued)

(52) U.S. Cl.
CPC ............ *H02J 7/025* (2013.01); *H02J 7/0047* (2013.01); *H02J 17/00* (2013.01); *H02J 50/12* (2016.02); *H02J 50/70* (2016.02); *H02J 50/90* (2016.02); *H02N 15/00* (2013.01); *H02J 7/0042* (2013.01)

(58) Field of Classification Search
CPC .. H02J 7/025; H02J 50/90; H02J 50/12; H02J 50/70; H02J 7/0047; H02J 17/00; H02N 15/00
See application file for complete search history.

(56) References Cited

U.S. PATENT DOCUMENTS 4,486,729 A * 12/1984 Lee .................. B60L 13/04
335/306
5,319,336 A * 6/1994 Alcon .................. B60L 13/04
310/12.27
(Continued)

FOREIGN PATENT DOCUMENTS

CN       101563922 A    10/2009
EP       2381558 A2     10/2011
(Continued)

*Primary Examiner* — Emily P Pham
(74) *Attorney, Agent, or Firm* — Birch, Stewart, Kolasch & Birch, LLP

(57) ABSTRACT

A levitation system that allows a mobile terminal to levitate from the bottom using the magnetic levitation principle and to provide a system for levitating a mobile terminal, which enables the mobile terminal to be wirelessly charged in a state in which the mobile terminal levitates, is provided.

18 Claims, 15 Drawing Sheets

(51) Int. Cl.
  *H02J 17/00* (2006.01)
  *H02J 7/00* (2006.01)

(56) References Cited

U.S. PATENT DOCUMENTS

| | | | | |
|---|---|---|---|---|
| 7,271,569 | B2 * | 9/2007 | Oglesbee | H02J 7/025 320/108 |
| 7,348,691 | B2 * | 3/2008 | Davis | A63H 33/26 104/284 |
| 7,728,551 | B2 * | 6/2010 | Reed | H02J 7/025 320/108 |
| 2006/0152309 | A1 * | 7/2006 | Mintchev | A61B 1/00158 335/58 |
| 2007/0170798 | A1 * | 7/2007 | Gohin | H02N 15/00 310/90.5 |
| 2009/0309440 | A1 | 12/2009 | Lieberman | |
| 2011/0163611 | A1 | 7/2011 | Lieberman | |
| 2014/0321022 | A1 * | 10/2014 | Mori | H01F 7/064 361/144 |
| 2014/0345957 | A1 * | 11/2014 | Bernstein | B60R 11/00 180/21 |
| 2015/0094122 | A1 | 4/2015 | Huang | |
| 2015/0224941 | A1 * | 8/2015 | Bernstein | G05D 1/0022 180/167 |

FOREIGN PATENT DOCUMENTS

| | | |
|---|---|---|
| KR | 10-2002-0093745 A | 12/2002 |
| KR | 20-0332408 Y1 | 11/2003 |
| KR | 10-2007-0010090 A | 1/2007 |
| KR | 10-2012-0036439 A | 4/2012 |
| KR | 20-2013-0006713 U | 11/2013 |
| WO | WO 2008/058562 A1 | 5/2008 |
| WO | WO 2013/131322 A1 | 9/2013 |

\* cited by examiner

FIG. 12
(a)
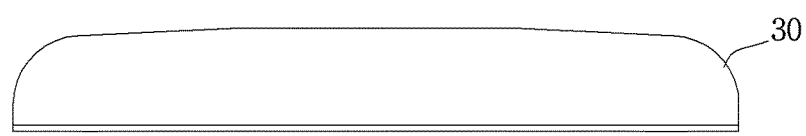
(b)
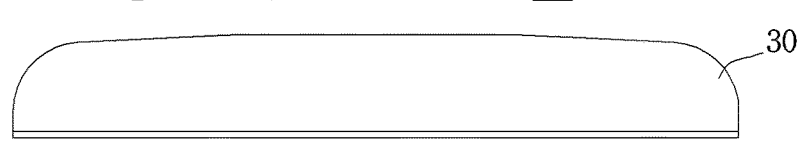
(c)
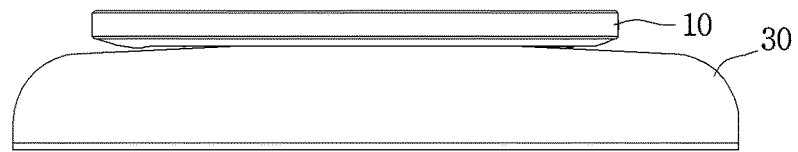

SYSTEM FOR LEVITATING MOBILE TERMINAL

CROSS REFERENCE TO RELATED APPLICATIONS

This application is the National Phase of PCT International Application No. PCT/KR2014/005090, filed on Jun. 10, 2014, which claims priority under 35 U.S.C. 119(a) to Patent Application No. 10-2014-0065554, filed in Republic of Korea on May 30, 2014, all of which are hereby expressly incorporated by reference into the present application.

TECHNICAL FIELD

The present invention relates to a system for levitating a mobile terminal.

BACKGROUND ART

Magnetic levitation refers to suspending an object using an electromagnetic force. There has appeared a magnetic levitation train moving by levitating vehicles over tracks using such a magnetic levitation principle.

The magnetic levitation principle is a principle that a permanent magnet is mounted at one side, an electromagnet is installed at the opposite side, and the intensity of current flowing in the electromagnet is adjusted, so that a target object is levitated in the air by a repulsive force.

In the case of such a magnetic levitation mechanism, if the centers of a permanent magnet and an electromagnet are deviated from each other, the permanent magnet and the electromagnet are attached to each other or obliquely push each other, and thus there may occur a phenomenon that a target object to be magnetically levitated drops to the bottom.

DISCLOSURE OF THE INVENTION

Technical Problem

An object of the present invention is to provide a levitation system that allows a mobile terminal to levitate from the bottom using the magnetic levitation principle and to provide a system for levitating a mobile terminal, which enables the mobile terminal to be wirelessly charged in a state in which the mobile terminal levitates.

Another object of the present invention is to provide a system for levitating a mobile terminal, in which the balance of the mobile terminal is maintained in a state in which the mobile is levitated from the bottom, thereby preventing the mobile terminal from dropping to the bottom, and the mobile terminal is not influenced by a magnetic force generated in a magnetic levitation process, thereby minimizing deterioration of the wireless charging performance of the mobile terminal.

Still another object of the present invention is to provide a system for levitating a mobile terminal, which enables the mobile terminal to be located at a regular position for itself through the control of an electromagnetic force in a state in which the centers of a permanent magnet and an electromagnet are deviated from each other.

Still another object of the present invention is to provide a user interface (UI/UX) which notifies a user of an event occurring in a mobile terminal in a state in which the mobile terminal levitates.

Technical Solution

According to an exemplary embodiment of the present invention, there is provided a system for levitating a mobile terminal, the system including: a levitation unit mounted on a rear surface of a mobile terminal; and a levitation module generating an electromagnetic force to allow the levitation unit to levitate upward, wherein the levitation unit includes: a mounting case attachably/detachably coupled to the rear surface of the mobile terminal; and a first permanent magnet seated on an inside of the mounting case, wherein the levitation module includes: a housing; a cover covering the housing; a magnet module disposed in the housing to form an electromagnetic field for levitating the levitation unit; and a PCB including a control unit connected to the magnet module to control a current supplied to the magnet module, wherein the magnet module includes: a plurality of electromagnets generating an electromagnetic field for allowing a repulsive force to act on the first permanent magnet; and a second permanent magnet surrounding an exterior of the plurality of electromagnets, the second permanent magnet configured to generate a magnetic field for allowing an attractive force to act on the first permanent magnet.

Advantageous Effects

The system for levitating the mobile terminal according to the exemplary embodiment of the present invention configured as described above has effects as follows.

First, unlike the existing magnetic levitation systems, a closed-loop-shaped permanent magnet is disposed at the periphery of electromagnets, so that a magnetic force strong enough to levitate the mobile terminal can be sufficiently generated.

Second, the balance of the mobile terminal is maintained in a state in which the mobile terminal levitates, so that it is possible to prevent the mobile terming from dropping to the bottom due to the imbalance of a magnetic force in the state in which the mobile terminal levitates in the air.

Third, wireless charging of the mobile terminal is possible even in a state in which the mobile terminal is levitated from an installation surface.

Fourth, the center alignment of the charging coils for wireless charging of the mobile terminal can be achieved through an interaction between pyrolytic graphite and the permanent magnet.

Fifth, various user interfaces are provided in the state in which the mobile terminal is levitated from the installation surface, so that a user can visually easily check an event occurring in the mobile terminal without identifying the display unit of the mobile terminal.

BRIEF DESCRIPTION OF THE DRAWINGS

FIG. 12 is a view sequentially illustrating the levitation state of the mobile terminal, which is performed according to the flowchart.

BEST MODE FOR CARRYING OUT THE INVENTION

Figure 1:
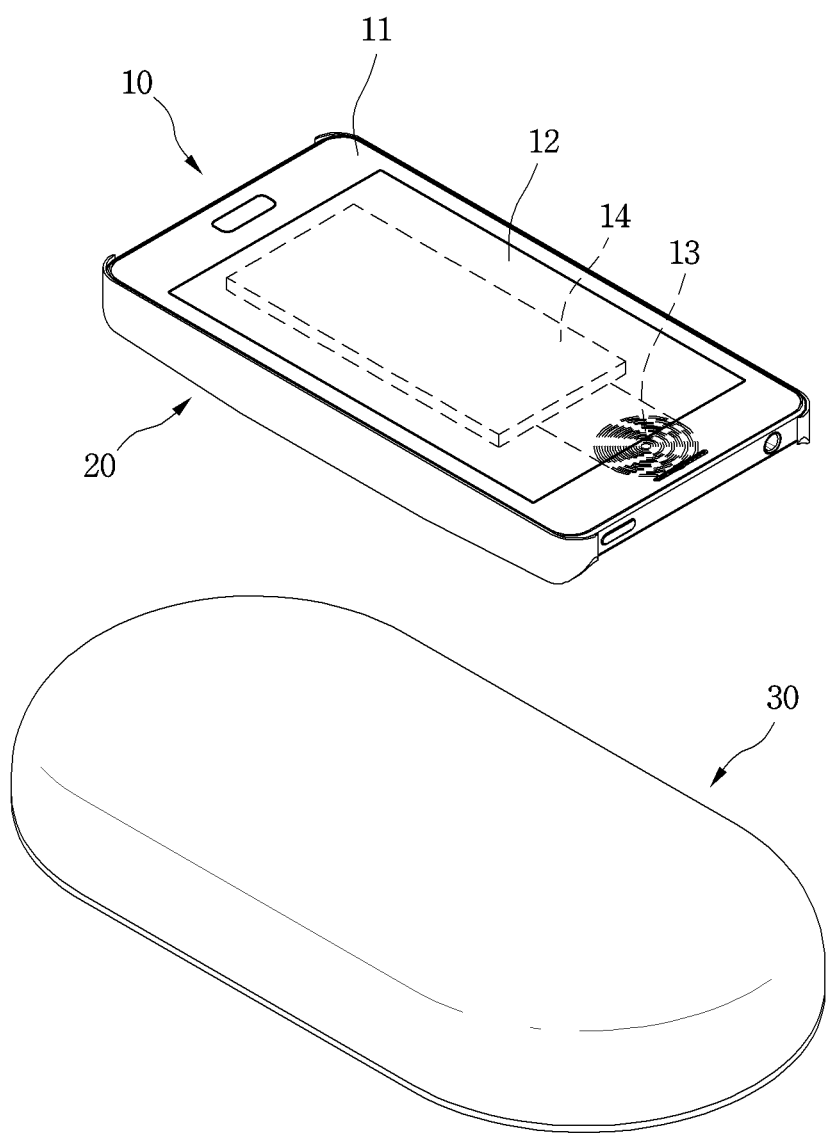
FIG. 1 is a perspective view illustrating a system for levitating a mobile terminal according to an exemplary embodiment of the present invention.
Figure 2:
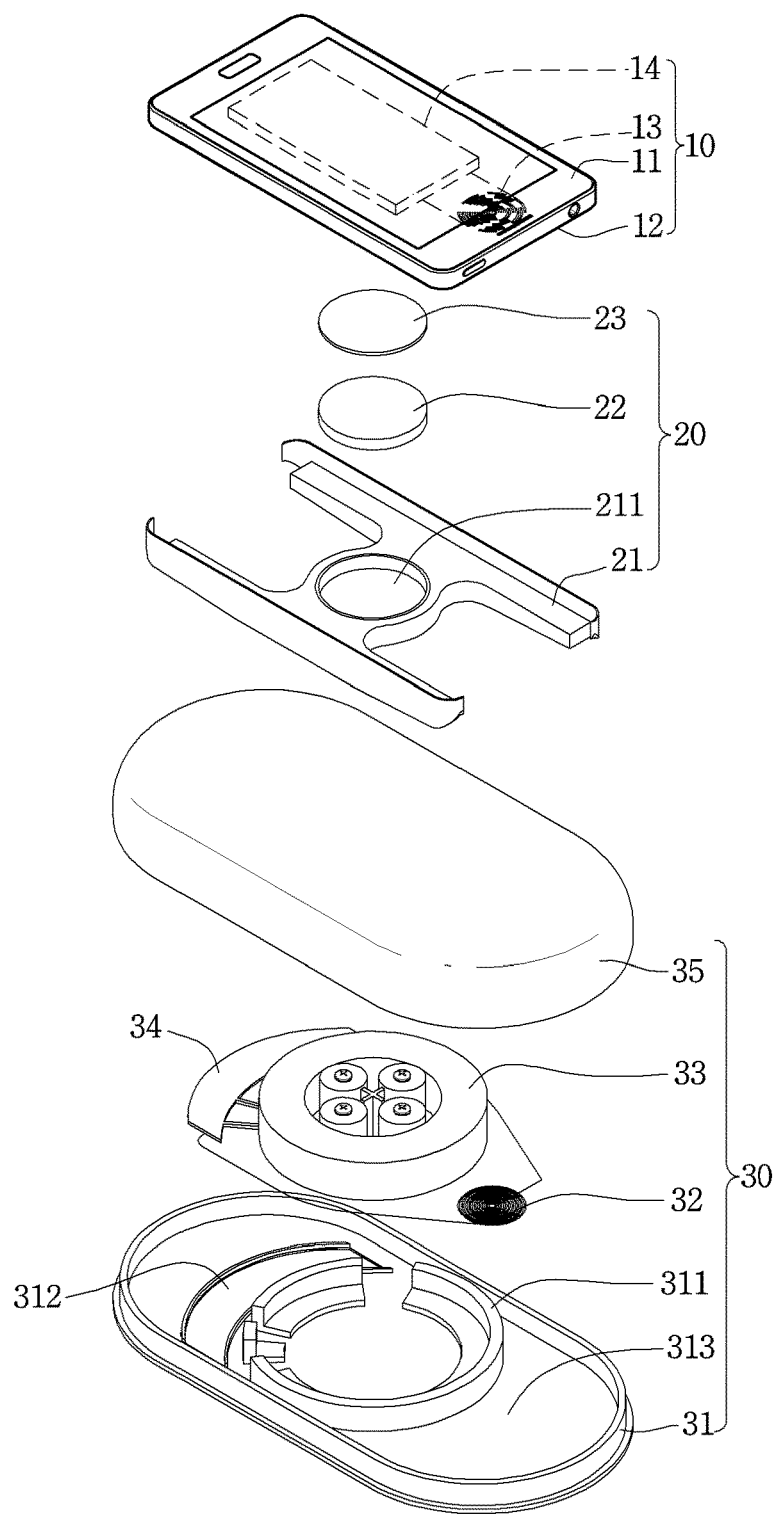
FIG. 2 is an exploded perspective view of the system.
Figure 3:
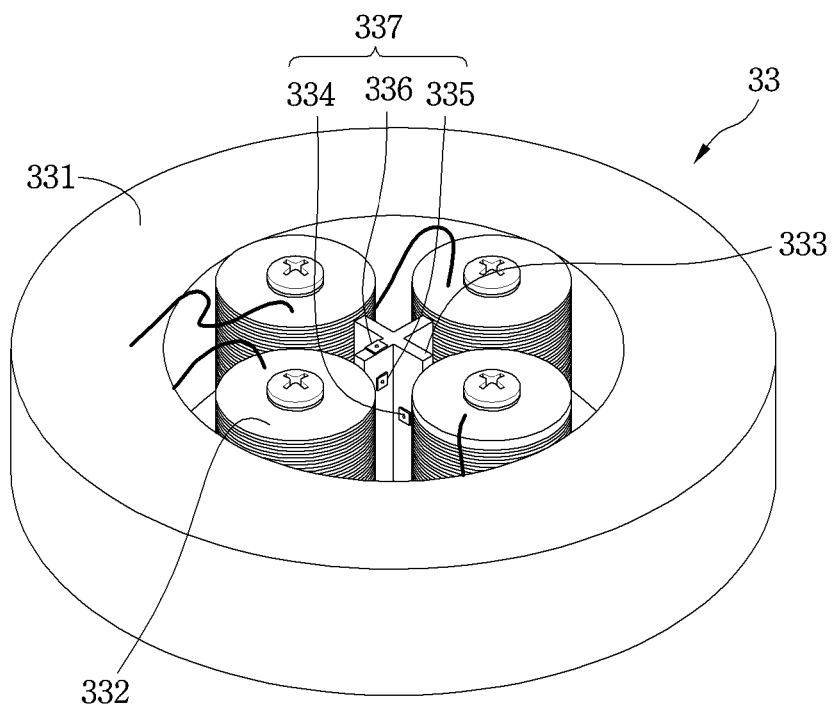
FIG. 3 is a perspective view of a magnet module constituting the system according to the exemplary embodiment of the present invention.
Figure 4:
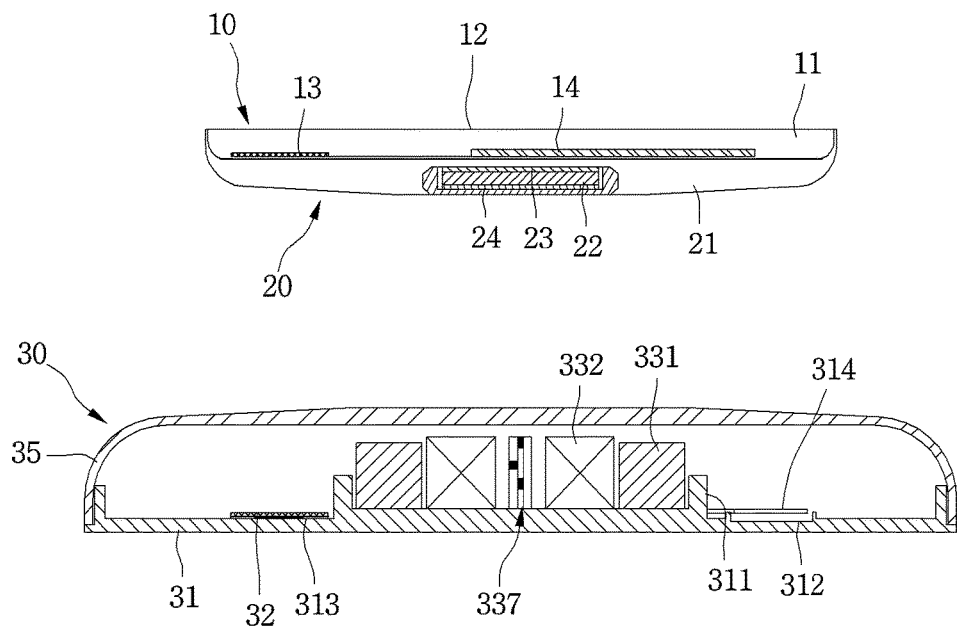
FIG. 4 is a longitudinal sectional view of the system.

FIG. 1 is a perspective view illustrating a system for levitating a mobile terminal according to an exemplary embodiment of the present invention. FIG. 2 is an exploded perspective view of the system. FIG. 3 is a perspective view of a magnet module constituting the system according to the exemplary embodiment of the present invention. FIG. 4 is a longitudinal sectional view of the system.

Referring to FIGS. 1 to 4, the system according to the exemplary embodiment of the present invention may include a mobile terminal 10, a levitation unit 20 mounted on the rear surface of the mobile terminal 10, and a levitation module 30 that levitates the mobile terminal 10 through an interaction with the levitation unit 20.

In detail, the mobile terminal 10 may include a back cover 11, a display unit 12 coupled to the front surface of the back cover 11, a battery 14 disposed between the display unit 12 and the back cover 11, and a charging coil 13 for wireless charging.

In more detail, the display unit 12 may include a display panel including an LCD panel or OLED panel, and a front panel made of a transparent material, the front panel being attached to the front surface of the display panel. In addition, the charging coil 13 is connected to the battery 14 to be charged by receiving power wirelessly supplied therethrough.

The levitation unit 20 may include a mounting case 21 attachably/detachably coupled to the back cover 14 of the mobile terminal 10, the mounting case 21 having a seating groove 211 formed in the inside thereof, a permanent magnet 22, which may also be referred to as a first permanent magnet, placed in the seating groove 211, and a shielding cover 23 covering the top surface of the permanent magnet 22 to shield a magnetic field generated from the permanent magnet 22.

In detail, the edge of the mounting case 21 is latched and coupled to the edge of the back cover 14. In addition, the shielding cover 23 is provided in the form of a metal sheet, to prevent the wireless performance of the mobile terminal 10 from being deteriorated by the magnetic field generated from the permanent magnet 22. In addition, the permanent magnet 22 may be adhered to the seating groove 211 by an adhesive layer 24 (see FIG. 4).

The levitation module 30 may include a housing 31, a cover 35 covering the top surface of the housing 31, a magnet module 33 seated on the inside of the housing 31, a charging coil disposed at one side of the magnet module 33, and a PCB 34 disposed at the opposite side of the magnet module 33.

In detail, the housing 31 may be formed in an elliptical shape as shown in these figures, or may be formed in a quadrangular shape or another shape. In addition, a support rib 311 supporting the magnet module 33 is formed in the inside of the housing 31 to protrude from the magnet module 33. The support rib 311 surrounds the periphery of the magnet module 33, and the magnet module 33 is seated on the inside of the support rib 311. In addition, a PCB seating part 312 having the PCB 34 seated thereon is formed in an inside of the housing 31. In addition, a coil seating part 313 having the charging coil 32 seated thereon may be formed in an inside of the housing 31, which corresponds to the outside of the support rib 311. In addition, the charging coil 32 and the magnet module 33 are electrically connected to the PCB 34.

In more detail, if power is applied to the charging coil 32 provided in the levitation module 30, a wireless charging signal is generated in the charging coil 32, and the generated wireless charging signal is transmitted to the charging coil 13 provided in the inside of the mobile terminal 10. In addition, the wireless charging signal is received through the charging coil 13 provided in the mobile terminal 10, thereby charging the battery 14. A wireless charging mechanism of the mobile terminal 10 may include not only a magnetic resonance type wireless charging mechanism but also an electromagnetic induction type wireless charge mechanism. Technical contents related to the wireless charging mechanism have already been widely known by those skilled in the art, and therefore, their detailed descriptions will be omitted.

In addition, the PCB 34 is a control unit that controls the amount of current supplied to the magnet module 33 and the charging coil 32. In detail, the amount of current supplied to the magnet module 33 is controlled so as to adjust the levitation height of the mobile terminal 10. Then, the intensity of an electromagnetic field generated from the magnet module 33 is controlled, so that the levitation height of the mobile terminal 10 can be adjusted. In addition, the amount of current supplied to the charging coil 32 through the PCB 34 is controlled based on the levitation height of the mobile terminal 10, i.e., the distance between the charging coils 32 and 13, so that the charging amount and charging rate of the battery 14 can be constantly maintained.

Meanwhile, the magnet module 33 according to the exemplary embodiment includes a plurality of electromagnets 332, a circular permanent magnet 331, which may also be referred to as a second permanent magnet, surrounding the exterior of the plurality of electromagnets 332, and a Hall sensor 337 disposed at the center of the plurality of electromagnets 332. The permanent magnet 331 may at least include a ferrite magnet.

In detail, four electromagnets 332 are disposed to generate an electromagnetic field in X-axis, Y-axis, and Z-axis directions. In addition, the Hall sensor 337 includes an X-axis sensor 334, a Y-axis sensor 334, and a Z-axis sensor 336. The three Hall sensors 334, 335, and 336 are attached to a sensor support part 333 in directions perpendicular to one another, to respectively detect components thereof. Then, the intensity of a magnetic field generated from the permanent magnet 22 can be three-dimensionally detected.

The sensors detect intensities of the magnetic field generated from the permanent magnet 22 in the X-axis, Y-axis, and Z-axis directions, respectively. In addition, the amount of current supplied to the electromagnets 332 of the levitation module 30 is controlled corresponding to the detected intensities of the magnetic field, so that the permanent magnet 22 of the mobile terminal 10 is aligned with the center of the magnet module 33. Further, the mobile terminal 10 continuously maintains a constant distance from the levitation module 30 in a horizontal state thereof.

Figure 5:
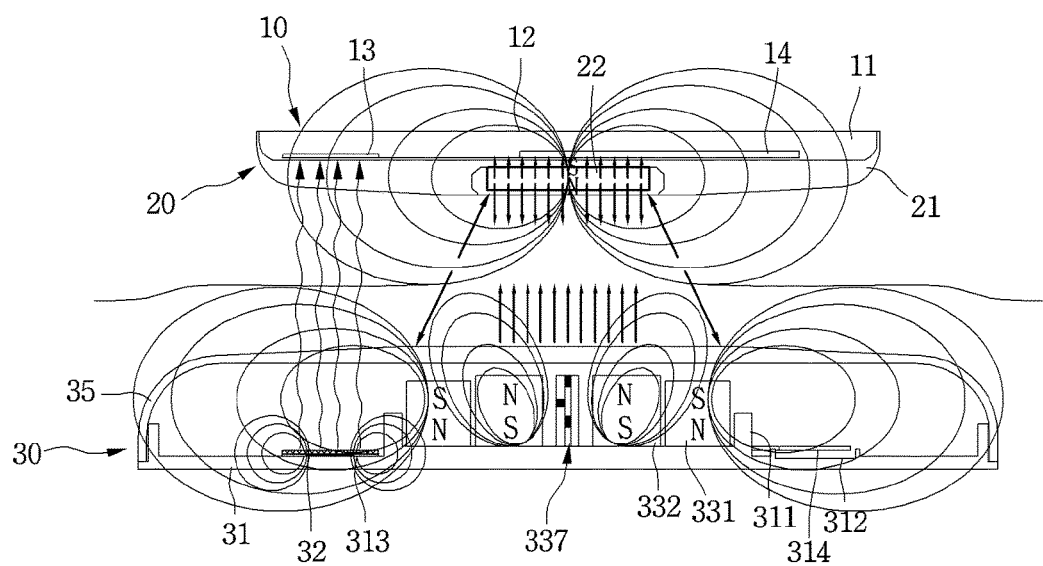
FIG. 5 is a view illustrating a magnetic levitation mechanism and a wireless charging mechanism, which occur in the system according to the exemplary embodiment.

FIG. 5 is a view illustrating a magnetic levitation mechanism and a wireless charging mechanism, which occur in the system according to the exemplary embodiment.

Referring to FIG. 5, if power is applied to the levitation module 30, a current flows in the charging coil 32. Then, a current is generated in the charging coil 13 of the mobile terminal 10 by electromagnetic induction or magnetic resonance, and the generated current is charged in the battery 14.

In addition, as a current flows in the electromagnets 332 of the magnet module 33, an electromagnetic field is generated, and a magnetic field is formed in the permanent magnet 331. In detail, as a repulsive force that would push the permanent magnet 22 of the levitation unit 20 acts at the center of the magnet module 33, the mobile terminal 10 is levitated by a predetermined distance from the levitation module 30. On the other hand, an attractive force acting on the permanent magnet 331 and the permanent magnet 22 to pull each other is generated at the periphery of the magnet module 33, i.e., between the permanent magnet 331 and the permanent magnet 22. Under the action of the attractive force, the mobile terminal 10 is not pushed to the outside by the repulsive force generated at the center of the magnet module 33 but maintains balance.

Meanwhile, as the shielding cover 23 disposed on the top surface of the permanent magnet 22 is attached to the permanent magnet 22, polar magnetism (S-pole magnetism in this figure) transferred to the inside of the mobile terminal 10 is decreased. Thus, the polar magnetism transferred to the mobile terminal 10 is shield. In addition, the polar magnetism transferred to the mobile terminal 10 reacts on the permanent magnet 331, thereby minimizing the generated repulsive force.

Meanwhile, the intensity of a voltage supplied to the electromagnets 332 is controlled so as to adjust the height at which the mobile terminal 10 is levitated from the levitation module 30. For example, if the voltage supplied to the electromagnets 332 increases, the levitation height of the mobile terminal 10 increases. On the contrary, if the voltage supplied to the electromagnets 332 decreases, the levitation height of the mobile terminal 10 decreases.

Figure 6:
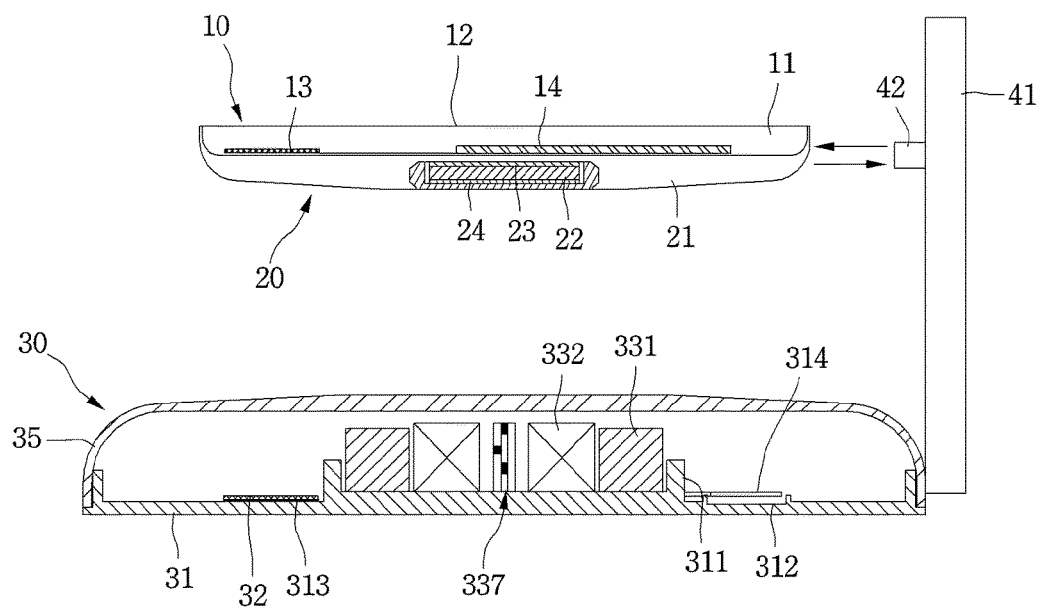
FIG. 6 is a view illustrating a method for adjusting the levitation height of the mobile terminal according to the exemplary embodiment of the present invention.

FIG. 6 is a view illustrating a method for adjusting the levitation height of the mobile terminal according to the exemplary embodiment of the present invention.

Referring to FIG. 6, a supporter 41 having a position sensor 42 attached thereto may be provided at one side of the levitation module 30.

In detail, the position sensor 42 may include an infrared sensor. Also, the position sensor 42 senses the mobile terminal 10. In addition, the intensity of a voltage supplied to the electromagnets 332 is controlled, thereby controlling the intensity of an electromagnetic field in the Z-axis direction. In addition, the intensity of the electromagnetic field in the Z-axis direction is increased until the mobile terminal 10 is sensed by the position sensor 42. Through such a method, an electromagnetic force having a constant magnitude can act on the levitation unit 20 by controlling the voltage supplied to the magnet module 33 such that the mobile terminal 10 is always sensed by the position sensor 42.

Figure 7:
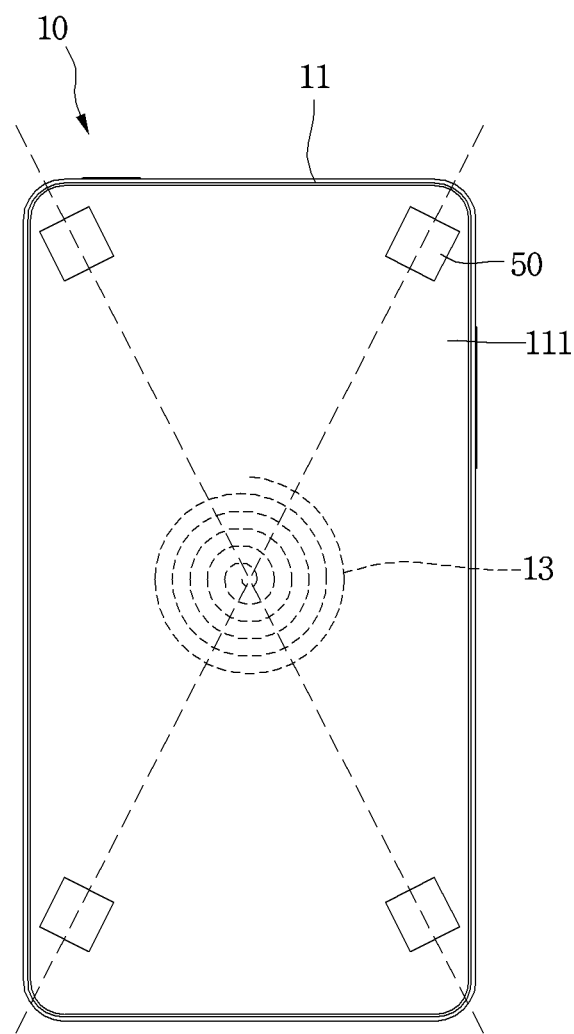
FIG. 7 is a rear view of a mobile terminal illustrating a levitation unit constituting a system for levitating the mobile terminal according to another exemplary embodiment of the present invention.
Figure 8:
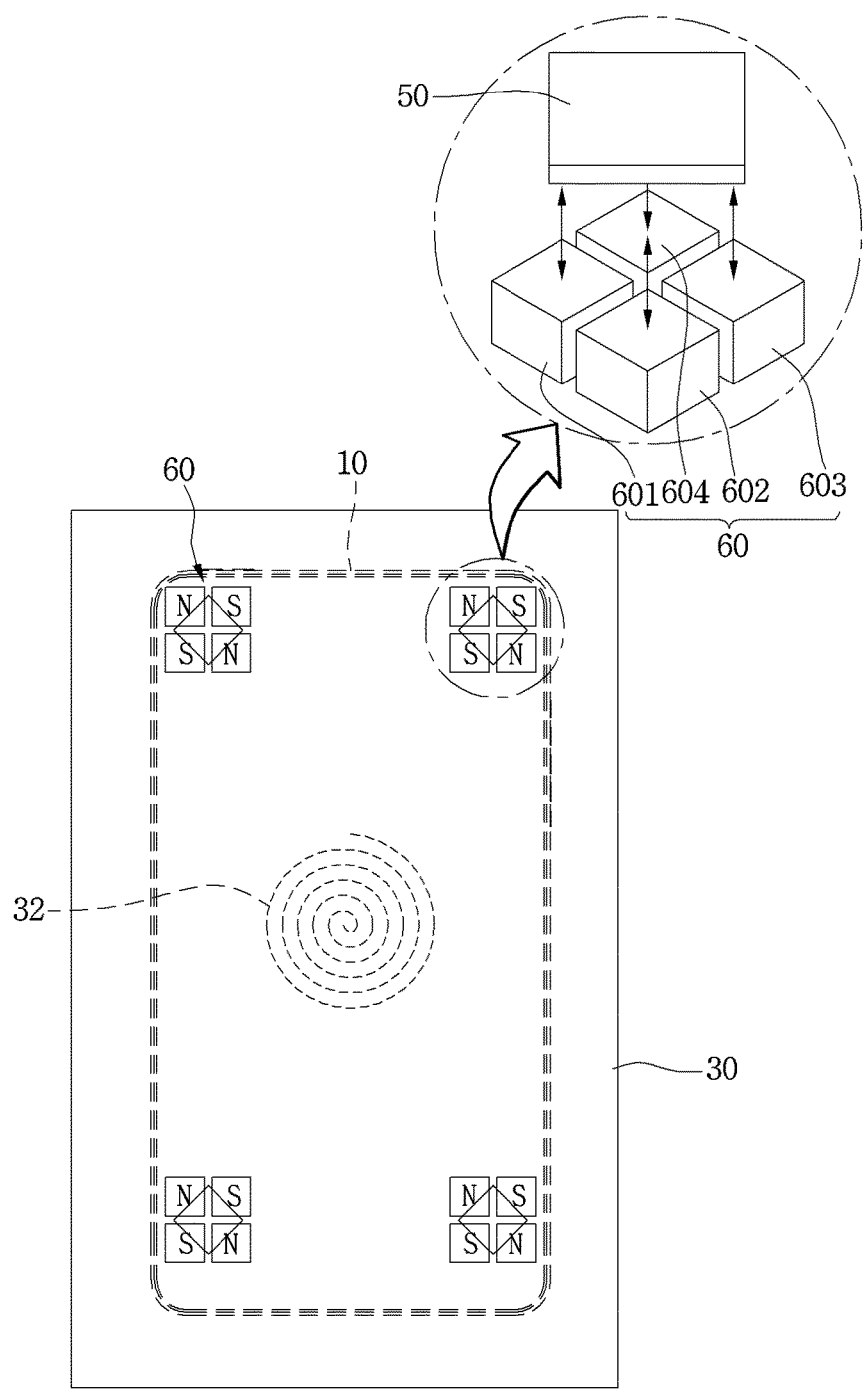
FIG. 8 is a plan view illustrating a levitation module according to the another exemplary embodiment of the present invention.

FIG. 7 is a rear view of a mobile terminal illustrating a levitation unit constituting a system for levitating the mobile terminal according to another exemplary embodiment of the present invention. FIG. 8 is a plan view illustrating a levitation module according to the another exemplary embodiment of the present invention.

Referring to FIGS. 7 and 8, the levitation unit constituting the system according to the another exemplary embodiment of the present invention may include magnetic levitation pads 50 attached to the rear surface of the mobile terminal 10, i.e., respective four corners of the back cover 11. In addition, the levitation module 30 constituting the system may include a magnetic levitation kit 60 that floats the magnetic levitation pad 50.

In detail, the charging coil 13 for wireless charging of the mobile terminal 10 may be disposed at the center of the mobile terminal 10, and the charging coil 32 of the levitation module 30, which corresponds to the charging coil 13, may also be disposed at the center of the levitation module 30.

In addition, four magnetic levitation kits 60 may be provided at points corresponding to the positions of the magnetic levitation pads 50 attached to the four corners of the mobile terminal 10, respectively. Then, in a state in which the mobile terminal 10 levitates above the levitation module 30, the centers of the charging coils 13 and 32 are aligned with each other, thereby performing wireless charging. In addition, as the four magnetic levitation kits 60 are located immediately under the four magnetic levitation pads 50, respectively, the magnetic levitation pad 50 is levitated from the magnetic levitation kit 60 by a magnetic field formed in the magnetic levitation kit 60.

Meanwhile, the magnetic levitation pad 50 may be a pyrolytic graphite sheet made of high-purity graphite having high electrical conductivity. The pyrolytic graphite sheet has a very high diamagnetic characteristic in at least one direction at room temperature, and may be formed by chemical vapor deposition.

In addition, the magnetic levitation kit 60 may include four magnets 610, 602, 603, and 604 disposed such that the opposite poles are disposed adjacent to each other, the four magnets 610, 602, 603, and 604 being disposed such that the same poles are disposed to face each other. In addition, if the magnetic levitation pad 50 is placed on the top surfaces of the four magnets 601, 602, 603, and 604, lines passing through the edges of the magnetic levitation pad 50 are to be placed in parallel to diagonal lines of the respective four magnets. Accordingly, magnetic fields respectively generated from the four magnets 601, 602, 603, and 604 are balanced, so that the magnetic levitation pad 50 levitates in a flat state. In this state, if the magnetic levitation pad 50 is pressed and then released, the magnetic levitation pad 50 is floated upward by a repulsive force.

Therefore, if the magnetic levitation pad 50 is attached to a corner of the back cover 11 of the mobile terminal 10, as shown in FIG. 7, a line passing through an edge of the magnetic levitation pad 50 is to be parallel to a diagonal line passing through the opposite corners of the mobile terminal 10.

In addition, a distance between adjacent magnetic levitation kits 60 is to be equal to that between adjacent magnetic levitation pads 50 if the magnetic levitation pads 50 are attached to the rear surface of the mobile terminal 10.

In addition, the charging coil 13 is located in the inside of the mobile terminal 10 such that the center of the charging coil 13 is placed at a point at which the diagonal lines of the mobile terminal 10 meet each other.

According to the structure described above, the mobile terminal 10 is placed on the top surface of the levitation module 30 such that 1) the centers of the magnetic levitation pads 50 correspond to those of the magnetic levitation kits 60, respectively, and 2) the lines passing through the edges of the magnetic levitation pad 50 is parallel to the diagonal lines of the magnets constituting the magnetic levitation kit 60.

the mobile terminal 10 is levitated by a predetermined distance from the magnetic levitation kit 60.

In addition, if the above-described two requirements are satisfied, the center of the charging coil 13 mounted in the mobile terminal 10 corresponds to that of the charging coil 32 mounted in the levitation module 30 such that wireless charging is possible. Thus, if a current flows in the charging coil 32 in this state, an inductive current is generated in the charging coil 13, and the generated inductive current is charged in a battery 14.

If the above-described two requirements are not satisfied, the mobile terminal 10 may drop down to the installation surface while jumping out to a side. In addition, as the centers of the charging coils do not correspond to each other, wireless charging may not be properly performed. Accordingly, there is proposed a structure that prevents the mobile terminal 10 from levitating and then dropping to the bottom even if a user does not recognize center alignment between the mobile terminal 10 and the levitation module 30.

Figure 9:
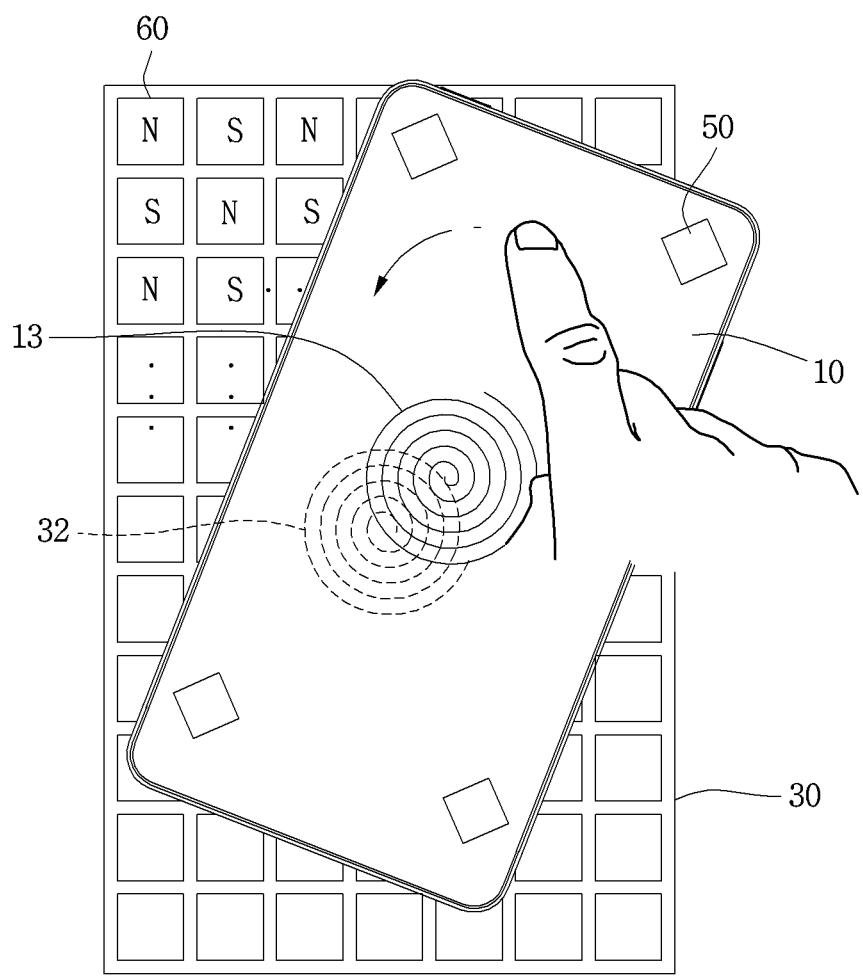
FIG. 9 is a plan view illustrating a system for levitating a mobile terminal according to still another exemplary embodiment.

FIG. 9 is a plan view illustrating a system for levitating a mobile terminal according to still another exemplary embodiment.

Referring to FIG. 9, the system according to this exemplary embodiment of the present invention is identical to the previous exemplary embodiment in that the magnetic levitation kits 60 are disposed on the top surface of the levitation module 30, and the magnetic levitation pads 50 are attached to the rear surface of the mobile terminal.

However, the system according to this exemplary embodiment of the present invention is different from the previous exemplary embodiment in that the magnetic levitation kits 60 are not disposed at specific positions to have a number corresponding to that of the magnetic levitation pads 50 and a distance corresponding to that between the magnetic levitation pads 50, but the magnetic levitation kit 60 is disposed on the entire top surface of the levitation module 30.

That is, as shown in FIG. 9, a plurality of magnets having magnetic poles are disposed on the top surface of the levitation module 30, and may be disposed such that adjacent magnets have magnetic poles opposite to each other. In other words, a plurality of magnets are disposed in the lateral and longitudinal directions on the top surface of the levitation module 30, and N and S poles are alternately formed in the lateral and longitudinal directions.

If the mobile terminal 10 having the magnetic levitation pads 50 attached thereto is placed above the levitation module 30 having the structure described above, the mobile terminal 10 is levitated at a predetermined height from the levitation module 30. In this case, if the mobile terminal 10 is not located at a regular position, i.e., if the centers of the charging coils 13 and 32 are not aligned with each other, the user may perform the center alignment by moving the mobile terminal 10 with a user's finger. Then, the mobile terminal 10 rotates and moves in the state in which the mobile terminal 10 is levitated from the levitation module 30, and thus the center alignment between the charging coils can be easily performed.

Figure 10:
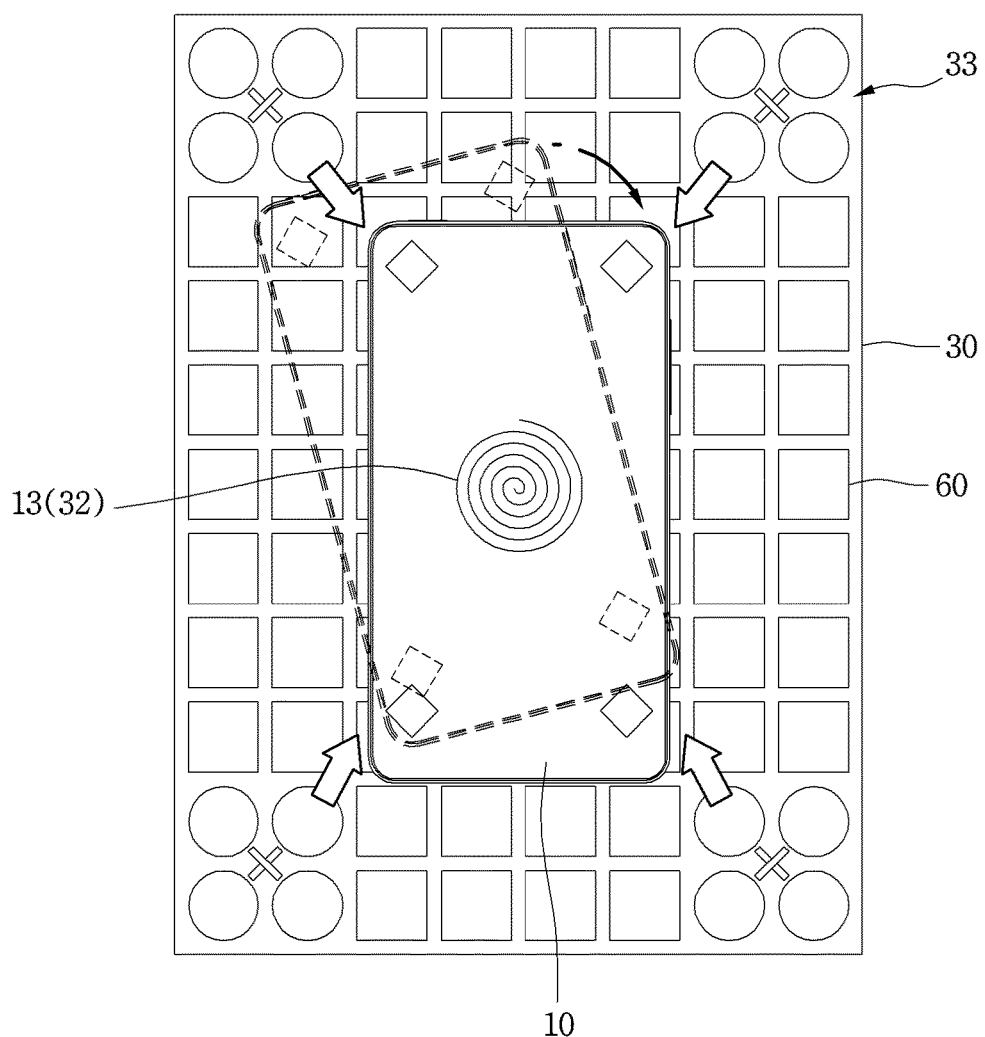
FIG. 10 is a plan view illustrating a system for levitating a mobile terminal according to still another exemplary embodiment.

FIG. 10 is a plan view illustrating a system for levitating a mobile terminal according to still another exemplary embodiment.

Referring to FIG. 10, the system according to this exemplary embodiment of the present invention uses the magnetic levitation pad 50 and the magnetic levitation kit 60. In this case, the magnet module 33 proposed in the exemplary embodiment of FIGS. 1 to 5 is mounted at the four corners of the levitation modules 30. Accordingly, although the user does not directly move the mobile terminal with a user's hand, the mobile terminal is movable to a regular position for wireless charging.

In detail, the magnet module 33 is disposed at each of the four corners of the top surface of the levitation module 30, and a current flows in the magnet module 33 to generate an electromagnetic field larger than a magnetic force of the magnetic levitation kit 60. Then, an electromagnetic field having the same magnitude is formed at the four corners of the levitation module 30, so that although the mobile terminal 10 levitates while being biased to any one side, the mobile terminal 10 is moved to the regular position for wireless charging by the electromagnetic field generated from the magnet module 33.

Hereinafter, a user interface (UI/UX) implemented to notify the user of a charging state of the mobile terminal or an event occurring in the mobile terminal in the state in which the mobile terminal is levitated from the levitation module 30 will be described.

Figure 11:
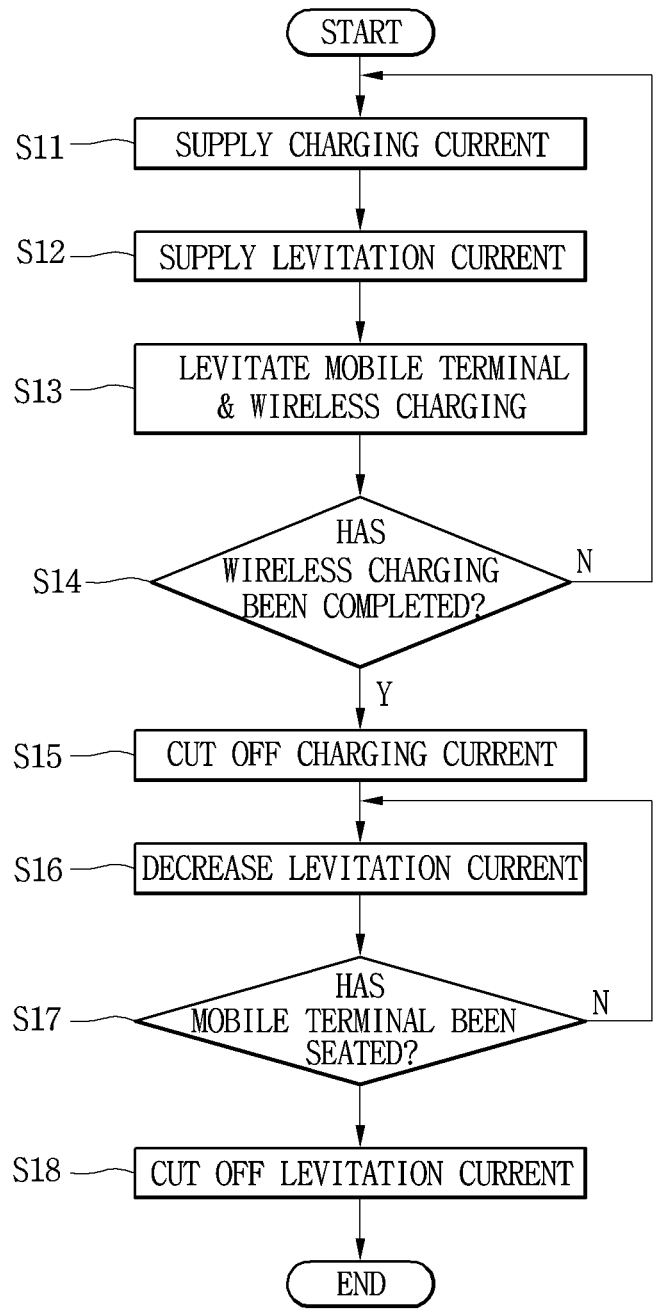
FIG. 11 is a flowchart illustrating a control algorithm for changing the levitation state of the mobile terminal depending on a charging state of the mobile terminal according to an exemplary embodiment of the present invention.

FIG. 11 is a flowchart illustrating a control algorithm for changing the levitation state of the mobile terminal depending on a charging state of the mobile terminal according to an exemplary embodiment of the present invention. FIG. 12 is a view sequentially illustrating the levitation state of the mobile terminal, which is performed according to the flowchart.

Referring to FIGS. 11 and 12, a control method according to this exemplary embodiment of the present invention may be applied to the system having a structure in which the mobile terminal 10 is seated on the top surface of the levitation module 30 in a state in which the levitation module 30 and the levitation unit 20 do not operate, and, if power is applied to the levitation module 30, the mobile terminal 10 is levitated from the levitation module 30.

In detail, a current is supplied as power is applied to the charging coil installed in the levitation module 30 in the state in which the mobile terminal 10 is seated on the levitation module 30 (S11), a levitation current is supplied as power is applied to the magnet module 33 at the same time or with a time difference (S12). Then, wireless charging is performed in a state in which the mobile terminal 10 is levitated at a predetermined height from the levitation module 30 as shown in (a) of FIG. 12 (S13).

In addition, a control unit (not shown) of the mobile terminal determines whether the wireless charging has been completed (S14). If the wireless charging is completed, the supply of the current to the charging coil 32 is cut off (S15). In addition, as the amount of current supplied to the levitation module 30 is decreased (S16), the mobile terminal 10 is slowly seated on the levitation module 30 as shown in (b) and (c) of FIG. 12 (S17). In addition, if the levitation state of the mobile terminal 20 is released as the mobile terminal 10 is seated on the levitation module 30, the supply of current to the levitation module 30 is cut off (S18). Here, after the wireless charging is completed, the amount of current supplied to the magnet module 33 may be gradually decreased so as to prevent the mobile terminal 10 from being broken while dropping to the levitation module 30.

According to the control method described above, the levitation state of the mobile terminal 10 is maintained in the state in which the mobile terminal 10 is charged, and, if the charging is completed, the levitation state of the mobile terminal 10 is released, so that the user can easily confirm whether the charging has been completed without checking the display unit of the mobile terminal 10.

Figure 13:
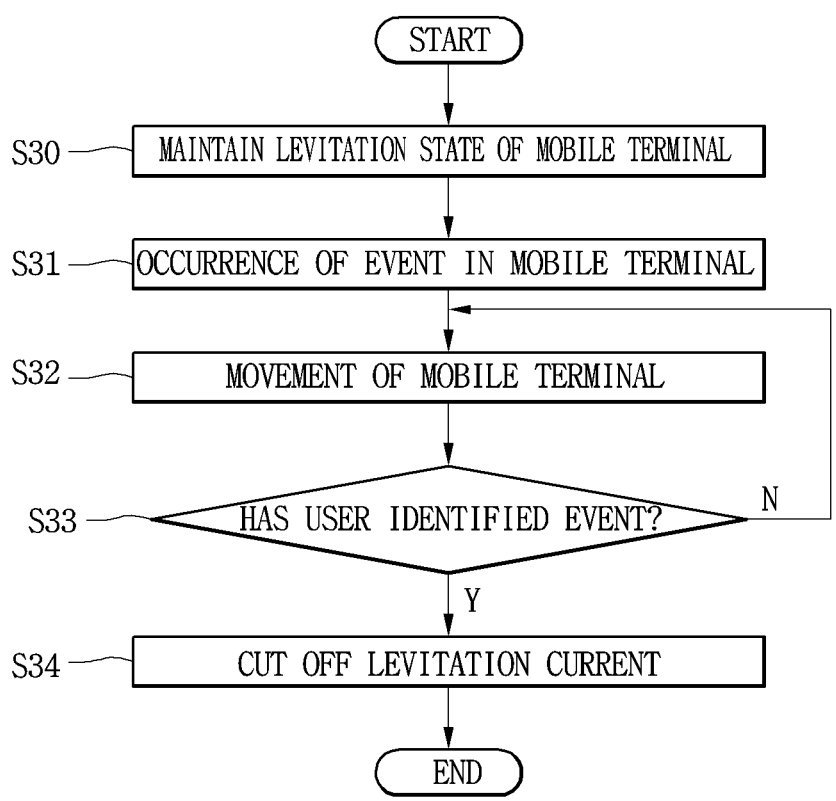
FIG. 13 is a flowchart illustrating a user interface control algorithm of the system according to another exemplary embodiment of the present invention.

FIG. 13 is a flowchart illustrating a control algorithm of a user interface control algorithm of the system according to another exemplary embodiment of the present invention.

Referring to FIG. 13, a user interface control algorithm according to this exemplary embodiment is characterized in that, if a predetermined event occurs at the mobile terminal 10 in a state in which the mobile terminal 10 levitates, the levitation state of the mobile terminal 10 is changed to visually notify the user of the occurrence of the event.

In detail, power is applied to the levitation module 30 such that the state in which the mobile terminal 10 levitates is maintained (S30). In this state, if a predetermined event occurs at the mobile terminal 10 (S31), the control of current supplied to the levitation module 30 is changed such that in the state the state of the mobile terminal 10 is changed from a horizontal state to another state in which the mobile terminal 10 levitates (S32).

In more detail, a plurality of electromagnets 332 are installed in the magnet module 32 of the levitation module as described above. If an event occurs at the mobile terminal 10, the amounts of current, respectively supplied to the plurality of electromagnets 332 may be differently controlled. Alternatively, in the system according to the exemplary embodiment of FIG. 10, the amounts of current supplied to the respective magnet modules 32 may be differently controlled. Then, the state of the mobile terminal 10 is changed from the horizontal state to another state, so that the user recognizes the changed state 15.

If the user identifies that the levitation state of the mobile terminal 10 has been changed, and identifies the event occurring in the mobile terminal (S33), the current supplied to the levitation module 30 is cut off (S34). Here, the method in which the user identifies the event occurring in the mobile terminal 10 may include an operation of lifting the mobile terminal 10.

Meanwhile, the event occurring at the mobile terminal 10 may include a reception of a voice or video call, a reception of a text message, an alarm, a notification of charging completion, a reception of an e-mail, and the like.

FIGS. 14 to 17 are views illustrating exemplary embodiments of a change in levitation state of the mobile terminal to notify a user that an event occurs in the mobile terminal in a state in which the mobile terminal levitates.

Figure 14:
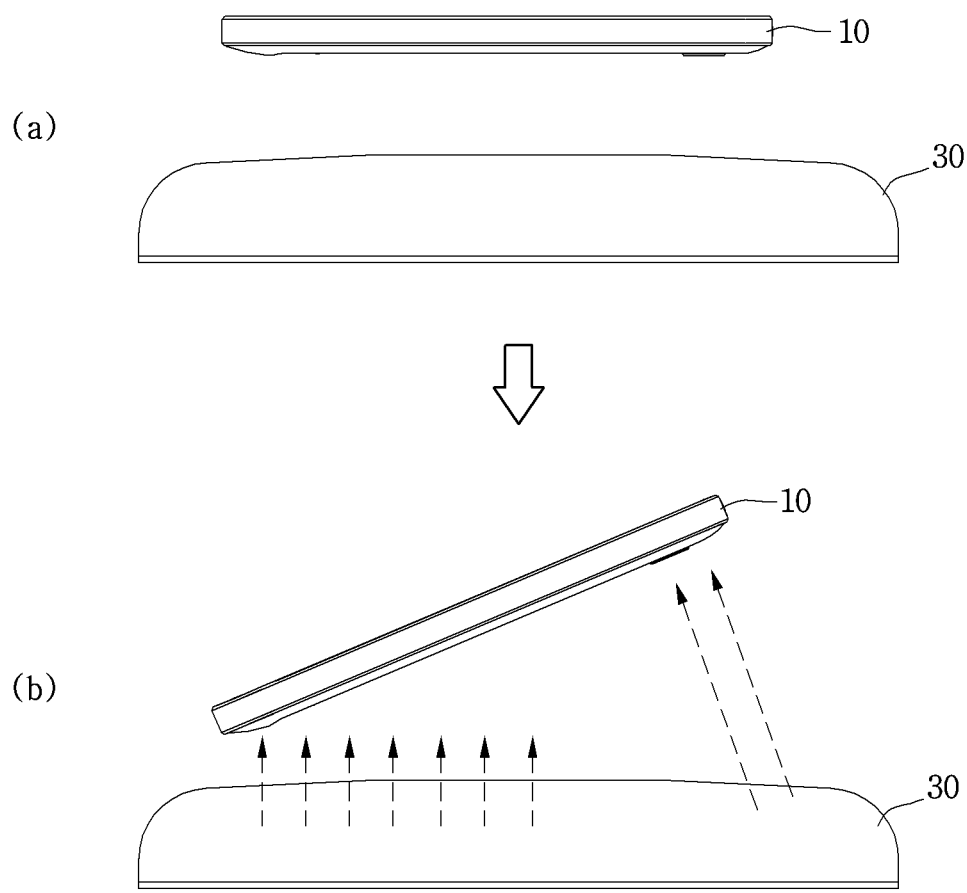
FIGS. 14 to 17 are views illustrating exemplary embodiments of a change in levitation state of the mobile terminal to notify a user that an event occurs in the mobile terminal in a state in which the mobile terminal levitates.

Referring to FIG. 14, if an event occurs at the mobile terminal 10 in the state in which the mobile terminal 10 levitates, as shown in this figure, the mobile terminal 10 in the horizontal state may be inclined at a predetermined angle from the top surface of the levitation module 30.

In detail, if an event occurs in the mobile terminal 10, the amounts of current supplied to the respective electromagnets 332 of the magnet module 32 are differently controlled. Therefore, the electromagnetic force in the Z-axis direction (vertical direction) among the electromagnetic forces acting on the mobile terminal may be changed. Particularly, as the electromagnetic force in the Z-axis direction, which acts on an upper portion of the rear surface of the mobile terminal 10, acts larger than the electromagnetic force in the Z-axis direction, which acts on a lower portion of the rear surface of the mobile terminal 10, the mobile terminal 10 may be obliquely inclined such that the display unit 12 of the mobile terminal 10 faces the user. Then, the mobile terminal 10 is in a state in which the user can identify the display unit 12 of the mobile terminal 10. If the user lifts the mobile terminal 10 to check the event, the current supplied to the levitation module 30 can be cut off.

Figure 15:
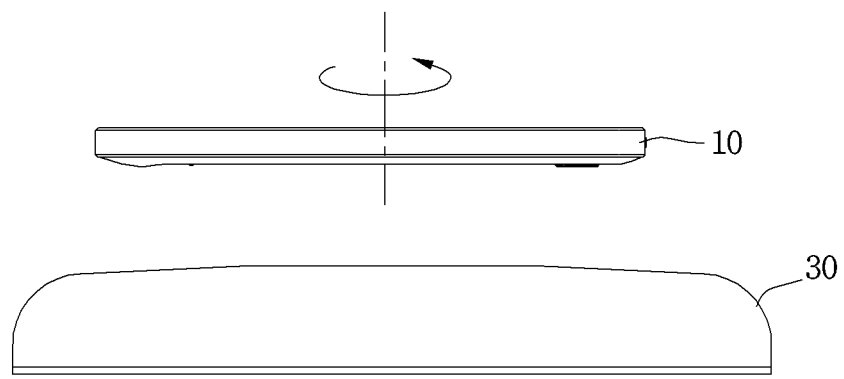

Referring to FIG. 15, if an event occurs in the mobile terminal 10, the current supplied to the electromagnets 332 of the magnet module 32 is controlled, and therefore, the mobile terminal 10 may rotate about the Z-axis. In detail, in the method for rotating the mobile terminal 10, the mobile terminal 10 may rotate in one direction, e.g., clockwise or counterclockwise, or may alternately rotate clockwise and counterclockwise. This can be achieved by controlling the current supplied to the magnet module 32 such that the magnetic force in the Z-axis direction is constantly maintained and the magnetic forces in the X-axis direction and the Y-axis direction are changed.

Figure 16:
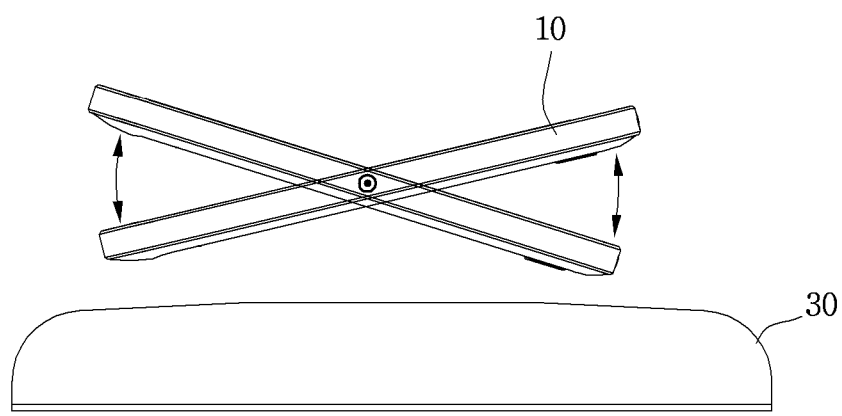

Referring to FIG. 16, if an event occurs in the mobile terminal 10, the current supplied to the magnet module 32 may be controlled such that the mobile terminal 10 performs a seesaw motion about the X-axis or Y-axis that becomes a horizontal axis.

In detail, if an event occurs in the mobile terminal 10, upper and lower end portions of the mobile terminal 10 may perform a seesaw motion about a horizontal axis in the length direction or a horizontal axis in the width direction, which passes through the center of the mobile terminal 10, so that the user recognizes the occurrence of the event.

Figure 17:
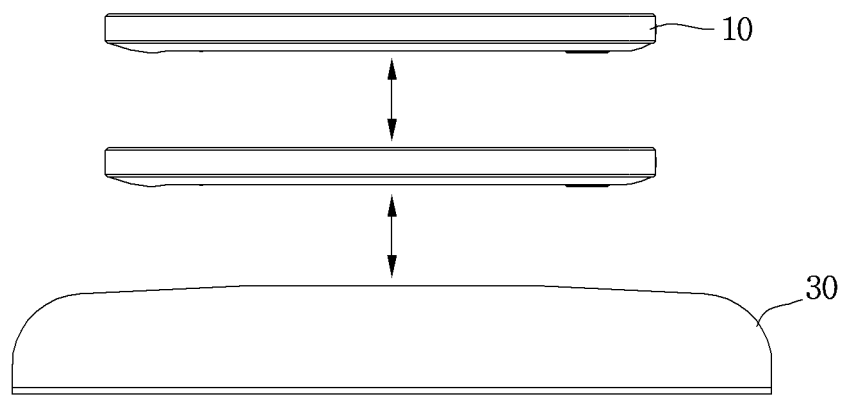

Referring to FIG. 17, if an event occurs in the mobile terminal 10, the levitation height of the mobile terminal 10 may be varied. That is, the mobile terminal 10 may repeat rising and falling by controlling the amount of current supplied to the magnet module 32, so that the user recognizes the occurrence of the event.

The invention claimed is:

1. A system for levitating a mobile terminal, the system comprising:
 a levitation unit mounted on a rear surface of the mobile terminal; and
 a levitation module configured to levitate the levitation unit upward,
 wherein the levitation unit includes:
  a mounting case; and
  a first permanent magnet placed in the mounting case,
 wherein the levitation module includes:
  a housing;
  a magnet module disposed in the housing to generate a magnetic field for levitating the levitation unit; and
  a control unit connected to the magnet module to control a current supplied to the magnet module,
 wherein the magnet module includes:
  a plurality of electromagnets configured to generate a magnetic field for allowing a repulsive force to act on the first permanent magnet; and
  a second permanent magnet configured to generate a magnetic field for allowing an attractive force to act on the first permanent magnet, and wherein the levitation module is configured to:
    rotate the mobile terminal about a vertical axis if an event is occurred at the mobile terminal in a state that the mobile terminal levitates.

2. The system according to claim 1, wherein the levitation module is configured to rotate the mobile terminal in a clockwise direction or in a counterclockwise.

3. The system according to claim 1, wherein the levitation module is configured to control the current supplied to the magnet module such that a magnetic force in a Z-axis direction is constantly maintained and magnetic forces in a X-axis direction and a Y-axis direction are changed.

4. The system according to claim 1, wherein the second permanent magnet includes a ferrite magnet.

5. The system according to claim 1, further comprising:
    a charging coil mounted at one side of an inside of the housing, the charging coil configured to receive a current supplied through the control unit to generate a magnetic field, and transmit, wirelessly, a power to a coil mounted in the mobile terminal in the state in which the mobile terminal levitates.

6. The system according to claim 5, wherein the charging coil transmits the power to the coil using a magnetic induction type or a magnetic resonance.

7. The system according to claim 5, wherein the levitation module is further configured to cut off the current supplied to the charging coil if charging of a battery mounted in the mobile terminal is completed.

8. The system according to claim 1, wherein the levitation module is further configured to cut off the current supplied to the magnet module if the mobile terminal is separated from a levitation area, the current supplied to the magnet module is cut off.

9. The system according to claim 1, wherein the event is occurred if the mobile terminal is moved in the state that the mobile terminal levitates.

10. The system according to claim 1, wherein the event includes any one event among a reception of a voice or video call, a reception of a text message, an alarm, a notification of charging completion, and a reception of an e-mail.

11. A levitation module for levitating a levitation unit mounted on a rear surface of the mobile terminal, the levitation module comprising:
    a housing;
    a magnet module disposed in the housing to generate a magnetic field for levitating the levitation unit; and
    a control unit connected to the magnet module to control a current supplied to the magnet module,
    wherein the magnet module includes:
        a plurality of electromagnets configured to generate a magnetic field for allowing a repulsive force to act on a first permanent magnet included in the levitation unit; and
        a second permanent magnet configured to generate a magnetic field for allowing an attractive force to act on the first permanent magnet, and
    wherein the levitation module is configured to:
        rotate the mobile terminal about a vertical axis if an event is occurred at the mobile terminal in a state that the mobile terminal levitates.

12. The levitation module according to claim 11, wherein the levitation module is configured to rotate the mobile terminal in a clockwise direction or in a counterclockwise.

13. The levitation module according to claim 11, wherein the levitation module is configured to control the current supplied to the magnet module such that a magnetic force in a Z-axis direction is constantly maintained and magnetic forces in a X-axis direction and a Y-axis direction are changed.

14. The levitation module according to claim 11, further comprising:
    a charging coil mounted at one side of an inside of the housing, the charging coil configured to receive a current supplied through the control unit to generate a magnetic field, and transmit, wirelessly, a power to a coil mounted in the mobile terminal in the state in which the mobile terminal levitates.

15. The levitation module according to claim 14, wherein the charging coil transmits the power to the coil using a magnetic induction type or a magnetic resonance.

16. The levitation module according to claim 14, wherein the levitation module is further configured to cut off the current supplied to the charging coil if charging of a battery mounted in the mobile terminal is completed.

17. The levitation module according to claim 11, wherein the levitation module is further configured to cut off the current supplied to the magnet module if the mobile terminal is separated from a levitation area, the current supplied to the magnet module is cut off.

18. The levitation module according to claim 11, wherein the event includes any one event among a reception of a voice or video call, a reception of a text message, an alarm, a notification of charging completion, and a reception of an e-mail.

* * * * *